US011940829B2

(12) United States Patent
Guiraud et al.

(10) Patent No.: US 11,940,829 B2
(45) Date of Patent: Mar. 26, 2024

(54) VOLTAGE REGULATOR AND METHODS OF REGULATING A VOLTAGE, INCLUDING EXAMPLES OF COMPENSATION NETWORKS

(71) Applicant: SCALINX, Paris (FR)

(72) Inventors: Lionel Guiraud, Saint-Aubin-sur-Mer (FR); Nguyen Trieu Luan Le, Cormelles-le-Royal (FR)

(73) Assignee: SCALINX, Paris (FR)

( * ) Notice: Subject to any disclaimer, the term of this patent is extended or adjusted under 35 U.S.C. 154(b) by 123 days.

(21) Appl. No.: 17/192,630

(22) Filed: Mar. 4, 2021

(65) Prior Publication Data

US 2022/0043471 A1 Feb. 10, 2022

(30) Foreign Application Priority Data

Aug. 7, 2020 (EP) .................................... 20290058

(51) Int. Cl.
*G05F 1/575* (2006.01)

(52) U.S. Cl.
CPC .................................... *G05F 1/575* (2013.01)

(58) Field of Classification Search
CPC .......... G05F 1/462; G05F 1/465; G05F 1/468; G05F 1/56; G05F 1/575; G05F 1/562; G05F 1/565; G05F 1/567; G05F 1/569; G05F 1/571; G05F 1/573; G05F 1/5735
See application file for complete search history.

(56) References Cited

U.S. PATENT DOCUMENTS 4,692,711 A * 9/1987 Miyasako ............... G05F 3/265 330/257
5,637,992 A * 6/1997 Edwards ................ G05F 3/267 323/280

(Continued)

FOREIGN PATENT DOCUMENTS

KR 10 713840 B1 * 7/2015
KR 2015 075460 A * 3/2017

OTHER PUBLICATIONS 20290058.5, Extended European Search Report, dated Dec. 18, 2020, 9 pages.

*Primary Examiner* — Thienvu V Tran
*Assistant Examiner* — Nusrat Quddus
(74) *Attorney, Agent, or Firm* — Stoel Rives LLP

(57) ABSTRACT

A voltage regulator and method. The voltage regulator includes a first amplifier having: a first input couplable to a reference voltage; a second input coupled to a feedback path; a current mirror; first and second branches coupled to an input and output of the current mirror. A node of the second branch forms an output of the first amplifier. The voltage regulator includes a second amplifier comprising a transistor having: a first terminal couplable to a supply voltage; a gate coupled to the output of the first amplifier; and a second terminal coupled to an output of the voltage regulator. The feedback path is coupled to the output of the voltage regulator. The voltage regulator includes a compensation network having at least one passive component to reduce variations in an output current of the voltage regulator caused by the parasitic capacitance of the transistor and variations in the supply voltage.

13 Claims, 8 Drawing Sheets

(56) References Cited

U.S. PATENT DOCUMENTS 5,686,820 A * 11/1997 Riggio, Jr. .............. G05F 1/575 323/280
5,990,671 A * 11/1999 Nagata .................... G05F 1/465 323/315
6,107,789 A * 8/2000 Fryer .................... H03L 7/0895 323/315
6,157,180 A * 12/2000 Kuo ........................ G05F 3/242 323/315
6,914,476 B2 * 7/2005 Ingino, Jr. ............ H03K 3/0315 327/143
7,106,233 B2 * 9/2006 Schroeder .............. G01R 33/07 324/71.3
7,132,880 B2 * 11/2006 Ingino, Jr. ............. H03L 7/0995 327/541
7,570,040 B2 * 8/2009 Migliavacca ............. G05F 3/30 323/280
7,573,252 B1 * 8/2009 Griesert .................. G05F 3/262 323/901
7,714,551 B2 5/2010 Fan et al.
7,919,954 B1 * 4/2011 Mannama ............... G05F 1/565 323/272
8,169,203 B1 * 5/2012 Vemula ................... G05F 1/575 323/273
8,278,893 B2 * 10/2012 Motz ....................... G05F 1/575 327/540
8,289,009 B1 * 10/2012 Strik ....................... G05F 1/575 323/280
8,866,457 B2 * 10/2014 Endo ....................... G05F 1/575 323/280
8,928,296 B2 1/2015 Iriarte et al.
9,395,731 B2 * 7/2016 Bhattad ..................... G05F 1/56
9,436,197 B1 * 9/2016 Tang ....................... G05F 1/565
9,442,501 B2 * 9/2016 Pietri ...................... G05F 1/575
9,577,508 B2 2/2017 Wang
9,588,541 B1 * 3/2017 Ho .......................... G05F 1/573
9,651,962 B2 * 5/2017 Bernardon .............. G05F 1/575
9,742,270 B2 8/2017 Petenyi et al.
9,766,643 B1 * 9/2017 Cai ......................... G05F 1/575
9,772,638 B2 * 9/2017 Zeng ....................... G05F 1/575
9,785,164 B2 10/2017 Aboudina et al.
9,791,480 B2 * 10/2017 Qin .................... G01R 19/0092
9,921,593 B2 3/2018 Gorecki et al.
10,146,240 B1 * 12/2018 Wang ...................... G05F 3/242
10,185,339 B2 1/2019 Fazeel et al.
10,296,026 B2 * 5/2019 Caffee ..................... G05F 1/468
10,359,800 B2 * 7/2019 Ramet ..................... G05F 3/262
10,566,936 B1 * 2/2020 Wessendorf ............ H03F 1/301
10,768,650 B1 * 9/2020 Huang .................... G05F 1/575
10,831,221 B1 * 11/2020 Tesch ...................... G05F 1/575
10,984,839 B2 * 4/2021 Tang ...................... G11C 16/30
11,036,247 B1 * 6/2021 Wei ......................... G05F 1/575
11,152,896 B2 * 10/2021 Lee ......................... G05F 1/575
2002/0005711 A1 * 1/2002 Bakker ................... G05F 1/575 323/280
2003/0178978 A1 * 9/2003 Biagi ...................... G05F 1/575 323/282
2005/0088153 A1 4/2005 Suzuki et al.
2005/0184711 A1 * 8/2005 Chen ....................... G05F 1/575 323/280
2006/0202745 A1 * 9/2006 Kobayashi ................ G05F 3/24 327/541
2007/0241731 A1 * 10/2007 van Ettinger ........... G05F 1/575 323/280
2008/0001585 A1 * 1/2008 Bakkaloglu ............. H03F 1/086 323/280
2008/0067991 A1 * 3/2008 Lee ......................... G05F 1/575 323/273
2008/0088286 A1 * 4/2008 Cho .......................... G05F 1/56 323/280
2009/0146725 A1 * 6/2009 Kimura ................... G05F 3/245 327/512
2009/0224737 A1 * 9/2009 Lou ......................... G05F 1/563 323/280
2010/0148736 A1 * 6/2010 Napravnik ............. G05F 1/575 323/280
2010/0164451 A1 * 7/2010 Cerchi .................... G05F 1/565 323/282
2010/0289472 A1 * 11/2010 Renous ................... G05F 1/575 323/282
2011/0101936 A1 * 5/2011 Wang ........................ G05F 1/56 323/280
2011/0156674 A1 * 6/2011 Lin ......................... G05F 1/575 323/282
2011/0254521 A1 * 10/2011 Iacob ........................ G05F 1/56 323/282
2012/0187927 A1 * 7/2012 Yu ........................... G05F 1/575 323/271
2013/0069608 A1 * 3/2013 Gakhar ................... G05F 1/575 323/273
2014/0117956 A1 * 5/2014 Price ....................... G05F 1/613 323/273
2014/0239929 A1 * 8/2014 Fiocchi ................... G05F 1/575 323/281
2014/0306751 A1 * 10/2014 Nakamoto ................ G05F 1/10 327/541
2015/0022166 A1 * 1/2015 Bisson .................... G05F 1/575 323/280
2015/0212530 A1 * 7/2015 Forejtek .................. G05F 1/575 323/280
2015/0346748 A1 * 12/2015 Pietri ...................... G05F 1/575 323/280
2015/0355653 A1 * 12/2015 Drebinger ................. H03F 3/34 323/280
2016/0013765 A1 * 1/2016 Peluso .................... H03F 1/303 330/260
2017/0090494 A1 * 3/2017 Cui ......................... G05F 1/562
2017/0097649 A1 * 4/2017 Lee ...................... G09G 3/3696
2017/0115678 A1 * 4/2017 Qing ....................... G05F 1/575
2017/0315574 A1 * 11/2017 Brown .................... G05F 1/468
2018/0017982 A1 * 1/2018 Song ....................... G05F 1/575
2018/0164843 A1 * 6/2018 Luo .................. H03K 17/04163
2018/0239380 A1 * 8/2018 Ciomaga ................. G05F 1/575
2018/0307259 A1 * 10/2018 Ogura ..................... G05F 1/575
2018/0364748 A1 * 12/2018 Wei ......................... G05F 1/575
2019/0220049 A1 * 7/2019 Qiu ........................... H03F 3/45
2019/0227587 A1 * 7/2019 Mikhael .................... G05F 3/30
2020/0073420 A1 * 3/2020 Singh ...................... G05F 1/575
2020/0244160 A1 * 7/2020 Mitev ..................... G05F 1/565
2020/0266770 A1 * 8/2020 Lee ..................... H03F 3/45183
2020/0343869 A1 * 10/2020 Gupta ................. H03F 3/45677
2021/0028747 A1 * 1/2021 Hu ...................... H03F 3/45197
2021/0223810 A1 * 7/2021 Golara ................ H03F 3/45183
2021/0373588 A1 * 12/2021 Wang ........................ G05F 1/59
2022/0103128 A1 * 3/2022 Bhattad ............... H03F 3/45632
2022/0171417 A1 * 6/2022 Fiocchi ................... G05F 1/575
2022/0276666 A1 * 9/2022 Wu ......................... G05F 1/571
2023/0074425 A1 * 3/2023 Kazemi .................... G11C 7/04

* cited by examiner

VOLTAGE REGULATOR AND METHODS OF REGULATING A VOLTAGE, INCLUDING EXAMPLES OF COMPENSATION NETWORKS

BACKGROUND

The present specification relates to a voltage regulator and to a method of regulating a voltage.

Reference voltage generators are a key element of integrated circuit in all domains. Reference voltage generators have multiple uses, such as providing a reference for comparator, or supply voltages for other functional blocks.

The accuracy and stability of the generated voltage is a key performance parameter in the function of a reference voltage generator. Various factors may impact the voltage accuracy and stability, such as component mismatch (in a differential pair or current mirror), or finite gain of an error amplifier in a feedback-loop based regulator.

External elements, such as interference or noise from a supply source supplying the voltage regulator, may also contribute to dynamic and random variations of the regulator voltage. Indeed, when high and/or random peak currents from a digital circuit or high-power driver are drawn from the supply, large voltage droops or oscillations may appear at the supply line due to the resistance or inductance of the supply interconnect. Such voltage disturbances may pass through the voltage regulator and modify significantly the value of the generated output voltage.

The mechanism or signal paths that cause the voltage disturbances from the supply to reach the output voltage depend on the structure of the voltage regulator as well as the parasitic elements of the components used in such voltage regulator.

The capability of a circuit, such as voltage regulator, to remain unaffected by disturbances from the supply is measured through its power supply rejection (PSR). The PSR may be defined by:

$$PSR(dB)=20\log(\delta V_{OUT}/\delta V_{DD})$$

where $V_{OUT}$ is the generated voltage, $V_{DD}$ is the supply voltage, $\delta V_{OUT}$ is the variation in the generated voltage and $\delta V_{DD}$ is the variation in the supply voltage.

In order to improve the stability of the regulated voltage, there is a need to enhance the power supply rejection.

SUMMARY

Aspects of the present disclosure are set out in the accompanying independent and dependent claims. Combinations of features from the dependent claims may be combined with features of the independent claims as appropriate and not merely as explicitly set out in the claims.

According to an aspect of the present disclosure, there is provided a voltage regulator comprising:

a first amplifier having:

a first input couplable to a reference voltage;

a second input coupled to a feedback path;

a current mirror having an input and an output;

a first branch coupled to the input of the current mirror; and a second branch coupled to the output of the current mirror, wherein a node of the second branch forms an output of the first amplifier;

a second amplifier comprising a transistor, wherein:

a first current terminal of the transistor forms a first input of the second amplifier couplable to a supply voltage;

a gate of the transistor forms a second input of the second amplifier coupled to the output of the first amplifier; and a second current terminal of the transistor forms an output of the second amplifier coupled to an output of the voltage regulator, wherein the transistor has a parasitic capacitance between the second current terminal and the gate, and wherein the feedback path is also coupled to the output of the voltage regulator; and a compensation network comprising at least one passive component, wherein the compensation network is coupled to the input of the current mirror to reduce variations in an output current produced by the output of the voltage regulator caused by the parasitic capacitance between the second current terminal and the gate of the transistor of the second amplifier and variations in the supply voltage.

The compensation network can improve the power supply rejection (PSR) of the voltage regulator by reducing variations in voltage/current at the output of the voltage regulator associated with variations in the supply voltage. In particular, the compensation network can compensate for changes in current through the transistor of the second amplifier associated with the parasitic capacitance between the second current terminal and the gate of the transistor of the second amplifier.

The compensation network may be operable to mimic a component network coupled between the second current terminal and the gate of the transistor of the second amplifier. The component network may comprise the aforementioned parasitic capacitance between the second current terminal and the gate of the transistor of the second amplifier, but may also comprise other components such as the stability compensation circuit to be defined below.

In one embodiment, the first amplifier may further comprise a transistor located in the first branch and a transistor located in the second branch. The transistors may be arranged as a differential pair. A gate of the transistor in the first branch may form the first input of the first amplifier couplable to the reference voltage. A gate of the transistor in the second branch may form the second input of the first amplifier coupled to the feedback path. The compensation network may be further operable to compensate for variations in the output current produced by the output of the voltage regulator caused by parasitic capacitance between a current terminal and the gate of the transistor in each branch and variations in the supply voltage. Accordingly, the compensation circuit may allow variations associated with the parasitic capacitance of transistors in the first amplifier to be compensated for, in addition to the parasitic capacitance of the transistor of the second amplifier, further to improve the PSR of the voltage regulator.

The compensation network may include a variety of arrangements of one or more passive components such as resistors, capacitors and inductors. The arrangement of these components may be chosen in accordance with the component network coupled between the second current terminal and the gate of the transistor of the second amplifier, to allow the aforementioned mimicking functionality to be performed by the compensation network.

The compensation network may comprise a first capacitor coupled between the first branch of the first amplifier and a reference voltage. The compensation network may further comprise a resistor and a second capacitor coupled in series. The series coupled resistor and second capacitor may be coupled in parallel with the first capacitor. The reference voltage to which the first capacitor is coupled may be ground.

The compensation network may comprise a first capacitor and a further current mirror. The first capacitor may be coupled between the first branch of the first amplifier and an input of the current mirror. An output of the further current mirror may be coupled to the output of the voltage regulator. This can allow the compensation current generated by the compensation network to be copied to the output of the voltage regulator.

The further current mirror may comprise a first transistor and a second transistor. A first current terminal of the first transistor of the compensation network may form the input of the further current mirror. A second current terminal of the first transistor of the compensation network may be coupled to a reference voltage. A gate of the first transistor of the compensation network may be coupled to a gate of the second transistor of the compensation network. A first current terminal of the second transistor of the compensation network may form the output of the further current mirror. A second current terminal of the second transistor of the compensation network may be coupled to a reference voltage. The gate of the first transistor of the compensation network may be coupled to the first current terminal of the first transistor of the compensation network.

A bias current may be supplied at the first current terminal of the first transistor of the compensation network. The bias current may be provided by, for example, a bias current generator.

The compensation network may further comprise a resistor and a second capacitor coupled in series between the first branch of the first amplifier and the input of the current mirror. The series coupled resistor and second capacitor may be coupled in parallel with the first capacitor.

The compensation network may thus include both passive and active components. The passive components may act to compensate for the effects of parasitic capacitance in components of the voltage regulator as noted above. The active components may further improve the PSR of the voltage regulator by preventing residual current/voltage variations from appearing at the output of the voltage regulator. The reference voltage to which the second current terminal of the first transistor of the compensation network and the second current terminal of the second transistor of the compensation network are coupled may be ground.

The voltage regulator may further comprise a stability compensation circuit coupled between the gate and the second current terminal of the transistor of the second amplifier. The compensation network may be further operable to reduce variations in the output current produced by the output of the voltage regulator caused by the stability compensation circuit and variations in the supply voltage. The stability compensation circuit may comprise a capacitor coupled between the gate and the second current terminal of the transistor of the second amplifier. The stability compensation circuit may further comprise a resistor. The capacitor and the resistor of the stability compensation circuit may be coupled in series between the gate and the second current terminal of the transistor of the second amplifier.

The feedback path may comprise at least two resistors arranged as a voltage divider. A node between two of the resistors may be coupled to the second input of the first amplifier.

According to another aspect of the present disclosure, there is provided a reference voltage generator comprising the voltage regulator of the kind set out above.

According to a further aspect of the present disclosure, there is provided a method of regulating a voltage, the method comprising:

providing a voltage regulator of the kind set out above;

coupling the first input of the first amplifier to the reference voltage;

coupling the first input of the second amplifier to the supply voltage; and using the compensation network to reduce variations in an output current produced by the output of the voltage regulator caused by the parasitic capacitance between the second current terminal and the gate of the transistor of the second amplifier and variations in the supply voltage.

The compensation network may mimic a component network coupled between the second current terminal and the gate of the transistor of the second amplifier.

The compensation network may comprise a first capacitor coupled between the first branch of the first amplifier and a reference voltage. The compensation network may comprise the first capacitor and may further comprise a resistor and a second capacitor coupled in series, wherein the series coupled resistor and second capacitor are coupled in parallel with the first capacitor.

BRIEF DESCRIPTION OF THE DRAWINGS

Embodiments of this disclosure will be described hereinafter, by way of example only, with reference to the accompanying drawings in which like reference signs relate to like elements and in which.

DETAILED DESCRIPTION

Embodiments of this disclosure are described in the following with reference to the accompanying drawings.

Figure 1:
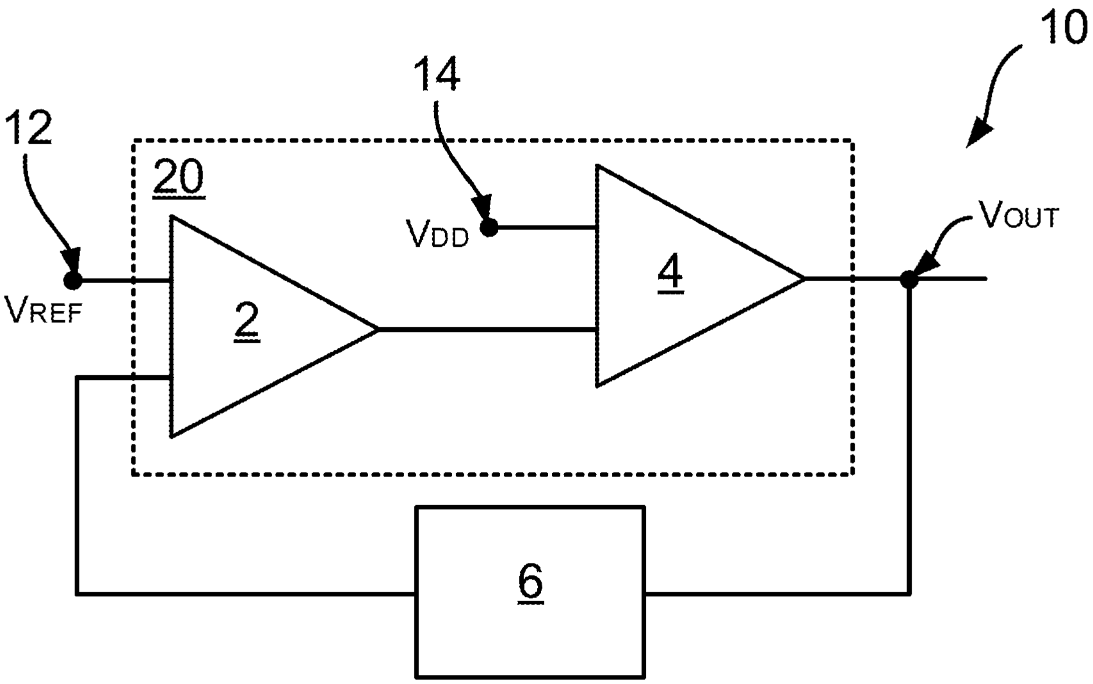
FIG. 1 schematically illustrates a two-stage voltage regulator.

FIG. 1 schematically illustrates a two-stage voltage regulator 10. The voltage regulator 10 includes an amplifier chain 20. The accuracy of the regulated output voltage $V_{OUT}$ depends on the gain of the amplifier chain 20. The higher the gain, the better the accuracy. Achieving high amplification gain may require the cascading of a plurality of amplifiers in series. In this example, the amplifier chain 20 includes a first amplifier 2 and a second amplifier 4. In some embodiments of this disclosure, more than two amplifiers may be present in an amplifier chain of the kind shown in FIG. 1, but for the purposes of brevity, only voltage regulators having two amplifiers will be described herein in detail.

The first amplifier 2 has two inputs and an output. A first input of the first amplifier 2 is couplable to a reference voltage, hereinafter referred to as $V_{REF}$, 12. The second amplifier 4 also has two inputs and an output. The first input of the second amplifier 4 is coupled to a supply voltage, hereinafter referred to as $V_{DD}$, 14. The second input of the second amplifier 3 is coupled to the output of the first amplifier 2. The output of the second amplifier 4 forms an output of the voltage regulator 10. The second input of the first amplifier 2 is coupled to one end of a feedback path 6 and the other end of the feedback path 6 is coupled to the output of the voltage regulator 10, to allow regulation of the output voltage. The second input of the first amplifier thus receives feedback signal $V_{OUT}/K$, where K is indicative of the amplification factor provided by the feedback path 6.

In operation, $V_{REF}$ is provided to the input of the amplifier chain 20 (i.e. at the first input of the first amplifier 2) and is reproduced at the output of the voltage regulator 10 with the ratio K (i.e. $V_{OUT}=V_{REF}*K$, where $V_{OUT}$ is the regulated output voltage of the voltage regulator 10). The value of K is defined by the transfer function of the feedback path 6.

Figure 2B:
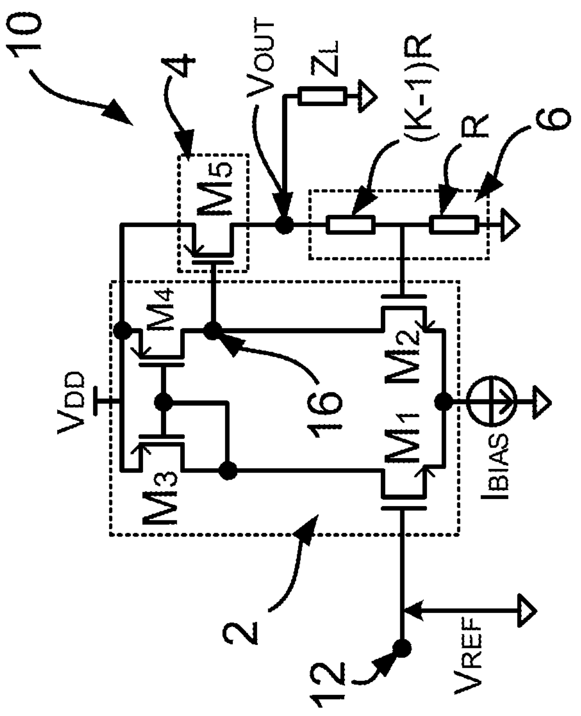
FIGS. 2A and 2B schematically illustrate transistor based implementations of the two-stage voltage regulator of FIG. 1.
Figure 2A:
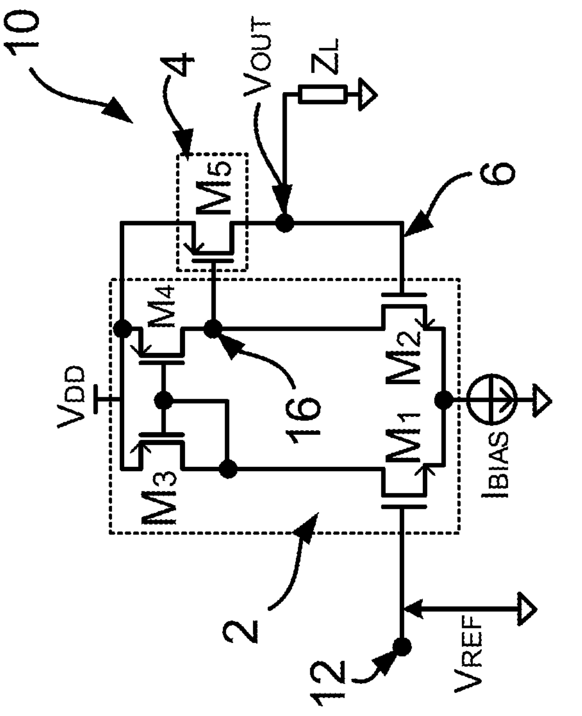

FIGS. 2A and 2B schematically illustrate transistor based implementations of the two-stage voltage regulator 10 of FIG. 1.

In the implementation shown in FIG. 2A, the first amplifier 2 includes a current mirror. The current mirror in this example is implemented using (field effect) transistors, although other current mirror implementations are envisaged. The transistors in this example are PMOS transistors, but it will be appreciated that, e.g. NMOS transistors could be used.

The current mirror in FIG. 2A includes a transistor $M_3$ and a transistor $M_4$. The gates of the transistors $M_3$, $M_4$ are coupled together and to the drain of the transistor $M_3$. The sources of the transistors $M_3$, $M_4$ are coupled to the supply voltage $V_{DD}$. The drain of the transistor $M_3$ forms an input of the current mirror, and the drain of the transistor $M_4$ forms an output of the current mirror.

The first amplifier 2 also has a first branch, which is coupled to the input of the current mirror, and a second branch, which is coupled to the output of the current mirror. A node 16 of the second branch forms the output of the first amplifier 2.

In the example of FIG. 2A, the first amplifier 2 may further include transistors $M_1$, $M_2$ arranged as a differential pair amplifier. The transistors M1, M2 in the present example are NMOS transistors, but it will be appreciated that, e.g. PMOS transistors could be used. The transistor M1 is located in the first branch of the first amplifier 2, while the transistor M2 is located in the second branch. The gate of the transistor $M_1$ forms the first input of the first amplifier 2, couplable to the reference voltage $V_{REF}$, 12. The gate of the transistor M2 forms the second input of the first amplifier 2, coupled to the feedback path 6. The sources of the transistors M1, M2 are coupled together and to current source $I_{BIAS}$, which in turn is coupled to ground. The drain of the transistor $M_1$ is coupled to the input of the current mirror via the first branch. The drain of the transistor $M_2$ is coupled to the output of the current mirror via the second branch.

In the example of FIG. 2A, the feedback path 6 thus comprises a simple connection between the output of the voltage regulator 10 and the second input of the first amplifier 2, whereby K=1.

The second amplifier 4 in this implementation includes a transistor $M_5$. In this example, the transistor $M_5$ is a PMOS transistor, but it will be appreciated that an NMOS transistor could be used. The source of the transistor $M_5$ forms the first input of the second amplifier 4 couplable to the supply voltage $V_{DD}$, 14. In this implementation, the source of the transistor $M_5$ is also coupled to the sources of the transistors $M_3$, $M_4$, whereby the sources of the transistors $M_3$, $M_4$, $M_5$ are collectively couplable to $V_{DD}$. The gate of the transistor $M_5$ forms the second input of the second amplifier 4, coupled to the output of the first amplifier 2 (the node 16). The drain of the transistor $M_5$ forms the output of the second amplifier 4 and is coupled to the output of the voltage regulator 10 (the voltage at the drain of the transistor $M_5$ is noted in FIG. 2A as being equal to the output voltage $V_{OUT}$ of the voltage regulator 10). The load driven by the voltage regulator 10 is represented in FIG. 2A by the impedance $Z_L$.

The implementation shown in FIG. 2B differs from the implementation shown in FIG. 2A in that the feedback path 6 includes a voltage divider. This allows the feedback signal provided to the second input of the first amplifier 2 to be biased, for adjusting the output voltage $V_{OUT}$ of the voltage regulator. The voltage divider may include two resistors connected in series. The second input of the first amplifier 2 (namely the gate of the transistor $M_2$ in this example) is coupled to a node located between the two resistors. In FIG. 2B, a first of the resistors, which is coupled between a node coupled to the second input of the first amplifier 2 and a reference voltage, typically ground, has resistance R, while a second of the resistors, which is coupled between the output of the voltage regulator 10 and the node coupled to the second input of the first amplifier 2, has resistance (K−1)R. The output voltage in FIG. 2B is again defined by $V_{OUT}=V_{REF}*K$, but using the voltage divider shown in the FIG. 2B, the value of K can be chosen by the selecting the ratio of the resistances of the two resistors.

Figure 3:
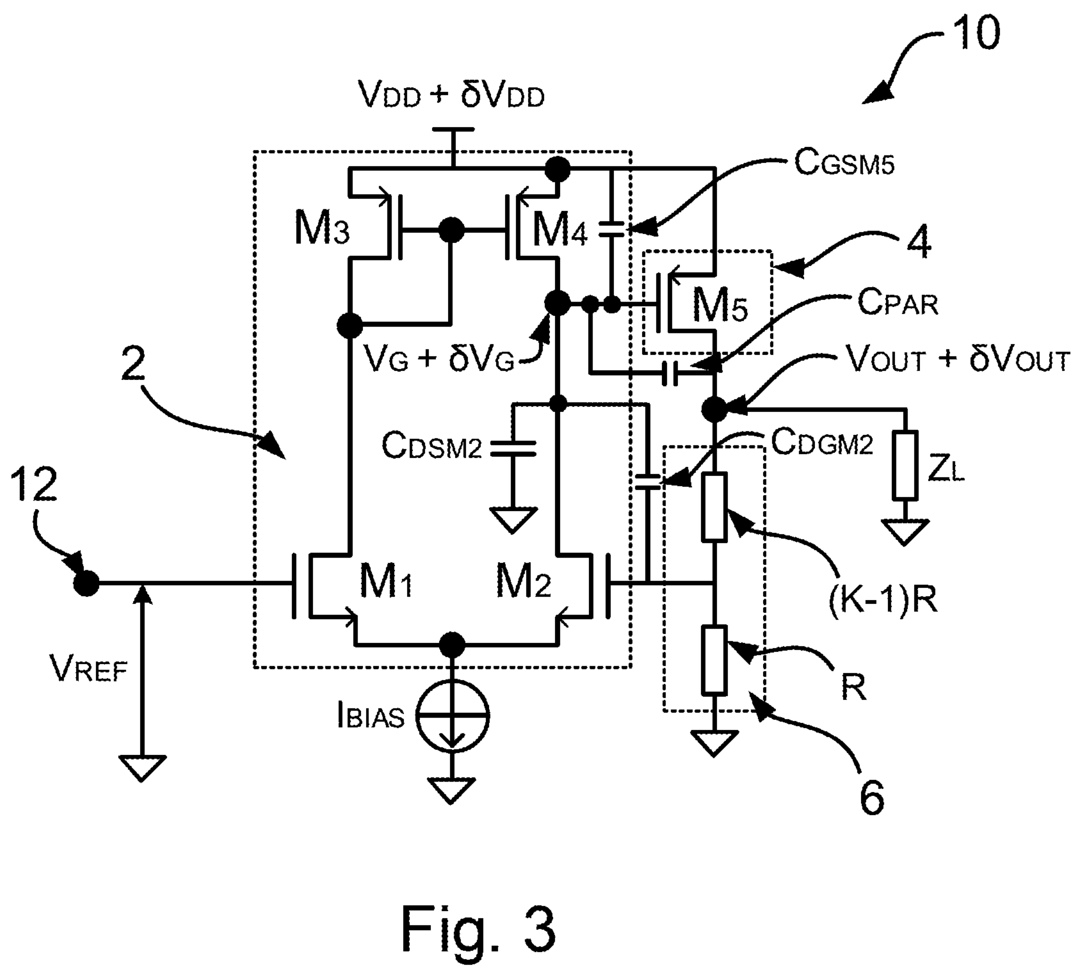
FIG. 3 schematically illustrates a number of parasitic elements that may contribute to variations in $V_{OUT}$ in the transistor based implementation of FIG. 2B, FIG. 4 schematically illustrates the effect of supply voltage variations in the transistor based implementation of FIGS. 2B and 3.
Figure 4:
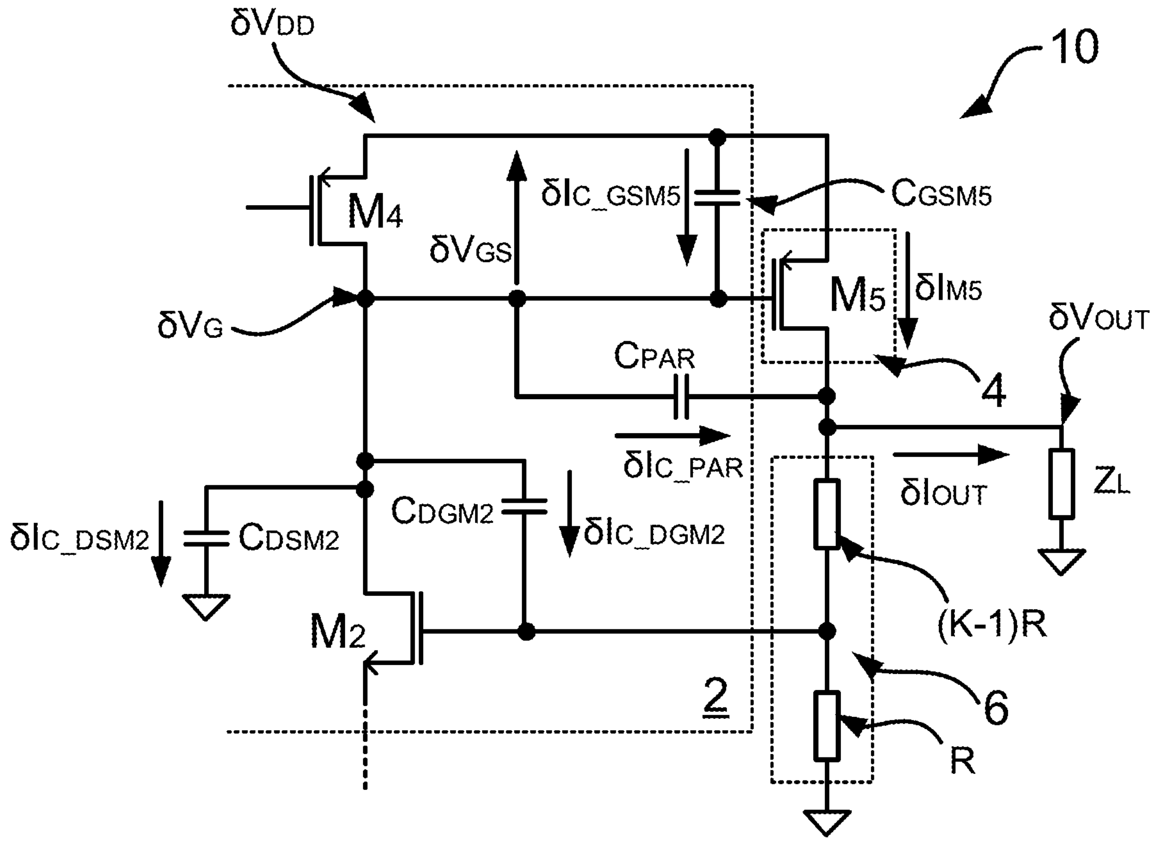

FIG. 3 schematically illustrates a number of parasitic elements that may contribute to variations in $V_{OUT}$ in the transistor based implementation of FIG. 2B, while FIG. 4 schematically illustrates the effect of variations of the supply voltage $V_{DD}$ in combination with the aforementioned parasitic elements, in causing these variations in $V_{OUT}$. It will be appreciated that similar considerations would apply to the transistor implementation of FIG. 2A, or indeed to other amplifier implementations. Note that in FIG. 4 certain elements of the first amplifier 2 are omitted, so as to focus on the remaining parts of the voltage regulator 10.

As shown in FIG. 3, peak current flowing from the supply of $V_{DD}$ combined with $V_{DD}$ line resistance may cause a variation in the supply voltage $V_{DD}$, which will be referred to herein after as $\delta V_{DD}$. This variation in voltage may lead to a variation in the output voltage $V_{OUT}$ of the voltage regulator 10, which will be referred to hereinafter as $\delta V_{OUT}$. The change in output voltage $\delta V_{OUT}$ may arise due to parasitic components of the transistors of the voltage regulator 10 (in particular of the transistor $M_5$, but possibly also of the transistor $M_2$, for instance) or intrinsic elements of the amplifiers 2, 4. In FIG. 3, the following capacitances are noted:

$C_{PAR}$ is the capacitance between the drain and gate of the transistor $M_5$;

$C_{GSM5}$ is the gate to source capacitance of the transistor $M_5$;

$C_{DGM2}$ is the drain to gate capacitance of the transistor $M_2$; and $C_{DSM2}$ is the drain-substrate/ground capacitance of the transistor $M_2$.

In this example, where variations $\delta V_{DD}$ in the supply voltage $V_{DD}$ occur, $C_{GSM5}$ couples the gate of $M_5$ to $V_{DD}$, thus creating a variation in the gate voltage ($V_G$) of the transistor $M_5$, which will be referred to hereinafter as $\delta V_G$.

In the ideal case, if the variation in gate voltage $\delta V_G$ is equal to $\delta V_{DD}$, there will not be a variation in the gate to source voltage ($V_{GS}$) of the transistor $M_5$ (referred to herein after as $\delta V_{GS}$), and consequently there will not be a change in current through the transistor $M_5$ which might lead to a variation ($\delta V_{OUT}$) in the output voltage $V_{OUT}$ of the voltage regulator 10.

However, the presence of the capacitance between the drain and gate of the transistor $M_5$, namely the capacitance $C_{PAR}$, coupled to the gate of $M_5$ creates a capacitor divider that can cause $\delta V_G$ to differ from $\delta V_{DD}$, thereby giving rise to a variation of the gate to source voltage $V_{GS}$ of the transistor $M_5$, $\delta V_{GS}$. The variation $\delta V_{GS}$ in turn leads to a change in the current passing through the transistor $M_5$, contributing to a variation $\delta V_{OUT}$ in the output voltage $V_{OUT}$ of the voltage regulator 10.

Note that $C_{DGM2}$ and $C_{DSM2}$ may also form part of the aforementioned capacitor divider, whereby the presence of $C_{DGM2}$ and $C_{DSM2}$ may also contribute to variations $\delta V_{OUT}$ in the output voltage $V_{OUT}$ of the voltage regulator 10 associated with $\delta V_{DD}$ and a change in the current flowing through the transistor $M_5$.

Put another way, in the mechanism described above, $\delta V_G$ causes a current flow through the capacitance $C_{PAR}$ (herein after $\delta I_{C\_PAR}$) and possibly also $C_{DGM2}$ ($\delta I_{C\_DGM2}$) and $C_{DSM2}$ ($\delta I_{C\_DSM2}$) in examples in which transistor $M_2$ forms part of the first amplifier 2. These currents flow to $V_{DD}$ via $C_{GSM5}$ ($\delta I_{C\_DGSM5}=\delta I_{C\_PAR}+\delta I_{C\_DGM2}+\delta I_{C\_DSM2}$) leading to a voltage variation across $C_{GSM5}$. The variation $\delta V_{GS}$ of the gate to source voltage of $M_5$ causes a change in the current $\delta I_{M5}$ flowing through the transistor $M_5$, thus giving rise to a change $\delta V_{OUT}$ in the output voltage $V_{OUT}$ of the voltage regulator 10.

Embodiments of this disclosure can provide a compensation network which may compensate for at least some of the effects described above. In particular, the compensation network may prevent the aforementioned current flow through $C_{GSM5}$, thereby to prevent variations in the gate to source voltage $V_{GS}$ of the transistor $M_5$ (i.e. $\delta V_{GS}=0$), whereby $\delta I_{M5}=0$. This may be achieved using an arrangement of one or more passive components in the compensation network. In some embodiments, the compensation network may also be provided with active components (such as transistors arranged as a current mirror) to prevent the current changes $\delta I_{C\_DGM2}$ and $\delta I_{C\_DSM2}$ flowing to the load $Z_L$, thereby minimizing $\delta I_{OUT}$ and $\delta V_{OUT}$. This can further improve the stability of $V_{OUT}$ and consequently further improve the PSR of the voltage regulator 10.

Embodiments of the present disclosure will now be described in relation to FIGS. 5 to 8. A comparison of FIGS. 5 to 8 with FIGS. 1 to 4 will reveal that the voltage regulators 10 in these embodiments have several features in common with the voltage regulators 10 described above. In the interests of brevity, the description of these features in common will not be repeated below.

Figure 5:
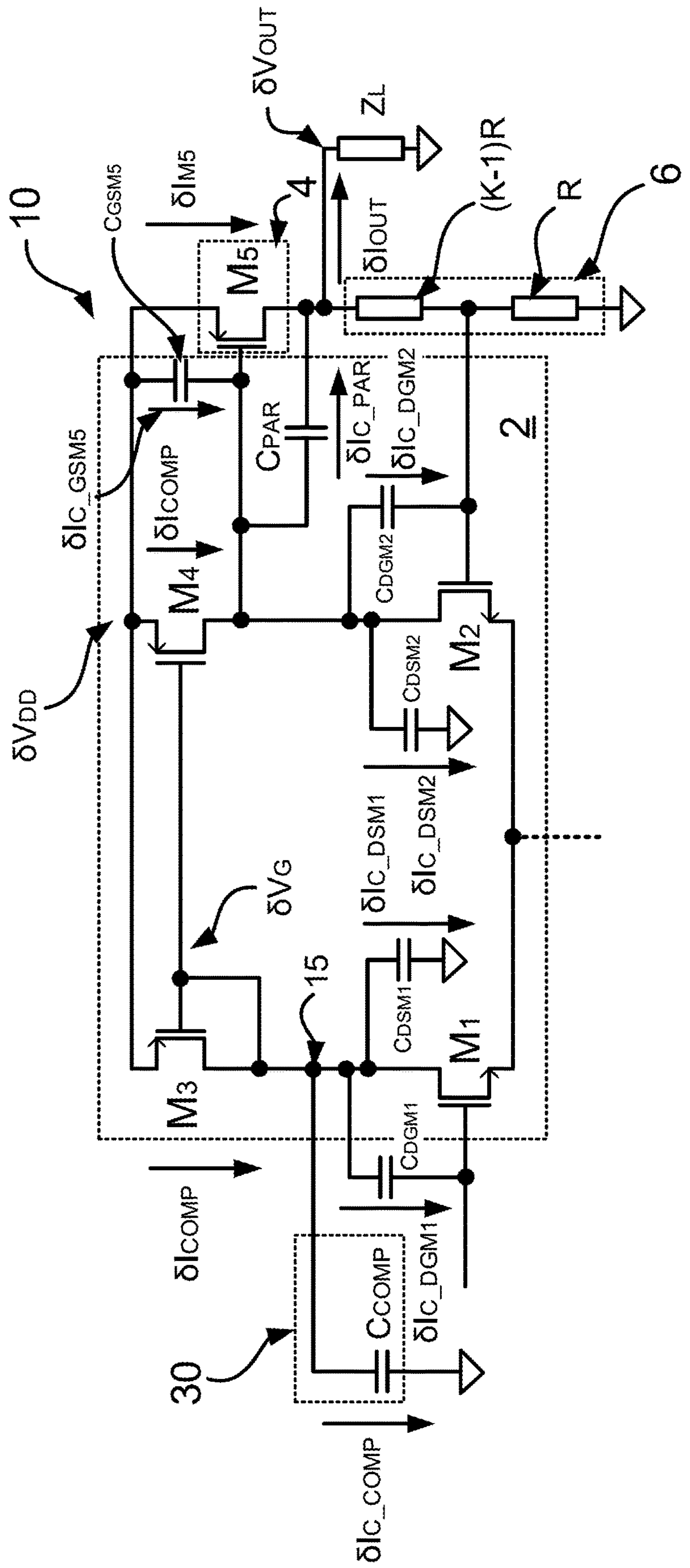
FIG. 5 schematically illustrates a voltage regulator with a compensation circuit according to an embodiment of this disclosure.

FIG. 5 schematically illustrates a voltage regulator 10 with a compensation circuit according to a first embodiment of this disclosure. In this embodiment, the voltage regulator shares features in common with the examples of FIGS. 2A and 2B—note that the feedback path 6 in FIG. 6 includes a voltage divider as described in relation to FIG. 2B, although this is not essential (e.g. the feedback path 6 may comprise a simple connection as described in relation to FIG. 2A). The first amplifier 2 in the embodiment of FIG. 5 includes transistors M1, M2 arranged as a differential pair, although as noted above in relation to FIG. 2, this particular amplifier construction is not considered to be essential.

In general, the passive components of the compensation network 30 according to embodiments of this disclosure may include a similar set of components (capacitor(s), resistor(s)), of similar value and arranged in a similar way to elements of the voltage regulator 10 comprising parasitic elements and optional design elements coupled to the output of the voltage regulator 10, between the output of the first amplifier 2 (i.e. gate of $M_5$) and ground and virtual grounds. In some embodiments, the output $V_{OUT}$ of the voltage regulator 10 may be considered as a virtual ground as the circuit of the embodiment is intended to minimize $V_{OUT}$ variation in presence of the supply voltage variation $\delta V_{DD}$. The purpose of the passive components of the compensation network 30 may be considered to be to generate and inject a current equivalent to the one drawn by the aforementioned elements at the output of the first amplifier 2. This may prevent variations in the current through $C_{GSM5}$ and thus act to keep $\delta I_{M5}=0$.

The compensation network 30 of the embodiment shown in FIG. 5 comprises a compensation capacitor $C_{COMP}$. An output of the compensation network 30 is coupled to a node 15 in the first branch of the first amplifier 2. In particular, in this embodiment, the capacitor $C_{COMP}$ is coupled between a reference voltage (e.g. ground) and the node 15. In this embodiment, the node 15 is located between the input of the current mirror of the first amplifier 2 and the drain of the transistor $M_1$. Note that in this embodiment, as well as the other embodiments described herein, the compensation network 30 is not connected to the output of the first amplifier 2. In FIG. 5, a compensation current $I_{COMP}$ flows through $C_{COMP}$, and variations in $I_{COMP}$ are denoted by $\delta I_{COMP}$.

In FIG. 5, the following capacitances are denoted:

- $C_{DGM1}$ is the parasitic drain to gate capacitance of the transistor $M_1$;
- $C_{DSM1}$ is the parasitic drain-substrate/ground capacitance of the transistor $M_1$;
- $C_{PAR}$ is the capacitance between the drain and gate of the transistor $M_5$ as explained previously;
- $C_{GSM5}$ is the parasitic gate to source capacitance of the transistor $M_5$ as explained previously;
- $C_{DGM2}$ is the parasitic drain to gate capacitance of the transistor $M_2$ as explained previously; and
- $C_{DSM2}$ is the parasitic drain-substrate/ground capacitance of the transistor $M_2$, also as explained previously.

Also in FIG. 5, the following currents are denoted:

- $\delta I_{COMP}$ is the compensation current generated by the compensation network 30;
- $\delta I_{C\_DGM1}$ is the current flowing through the parasitic capacitance $C_{DGM1}$;
- $\delta I_{C\_DSM1}$ is the current flowing through the parasitic capacitance $C_{DSM1}$;
- $\delta I_{C\_DGM2}$ is the current flowing through the parasitic capacitance $C_{DGM2}$, as explained previously;
- $\delta I_{C\_DSM2}$ is the current flowing through the parasitic capacitance $C_{DSM2}$, as explained previously;
- $\delta I_{C\_GSM5}$ is the current flowing through the parasitic capacitance $C_{GSM5}$, as explained previously; and
- $\delta I_{C\_PAR}$ is the current flowing through the capacitance $C_{PAR}$, also as explained previously.

The first amplifier 2 in this embodiment has a symmetrical configuration. Under supply variation $\delta V_{DD}$, the drain of $M_2$ has the same voltage variation as the drain of $M_1$ ($\delta V_G$). The parasitic capacitances $C_{DGM1}$ and $C_{DSM1}$ generate currents $\delta I_{C\_DGM1}$ and $\delta I_{C\_DSM1}$ that are copied by a current mirror comprising the transistors $M_3$ and $M_4$ and compensate for the currents $\delta I_{C\_DGM2}$ and $\delta I_{C\_DSM2}$.

As noted above, the compensation network 30 of the embodiment shown in FIG. 5 comprises a compensation capacitor $C_{COMP}$. Note that $C_{COMP}$ may be chosen to have substantially the same capacitance value as $C_{PAR}$, whereby the compensation network 30 may be operable to mimic the component network (which in this embodiment simply comprises $C_{PAR}$, but which may include further components, as will be explained below in relation to FIG. 6) coupled between the second current terminal and the gate of the transistor $M_5$ of the second amplifier 4. Accordingly, the compensation network 30 can allow the current generated at the output of the voltage regulator 10 by the parasitic capacitance $C_{PAR}$ to be compensated for.

In particular, the compensation current $\delta I_{C\_COMP}$ generated by the compensation capacitor $C_{COMP}$ of the compensation network 30 is copied by the current mirror and compensates for the current $\delta I_{C\_PAR}$ generated by $C_{PAR}$. The compensation current in this embodiment is given by $\delta I_{COMP}=\delta I_{C\_COMP}+\delta I_{C\_DGM1}+\delta I_{C\_DSM1}$ and compensates for the current generated by $C_{PAR}$, $C_{DGM2}$ and $C_{DSM2}$ ($\delta I_{C\_par}+\delta I_{C\_DGM2}+\delta I_{C\_DSM2}$). Because of this current compensation, no current flows through $C_{GSM5}$ when variations $\delta V_{DD}$ occur in the supply voltage $V_{DD}$, which in turn prevents variations $\delta I_{M5}$ in the current $I_{M5}$ through the transistor $M_5$ from being generated by variations $\delta V_{DD}$.

Figure 6:
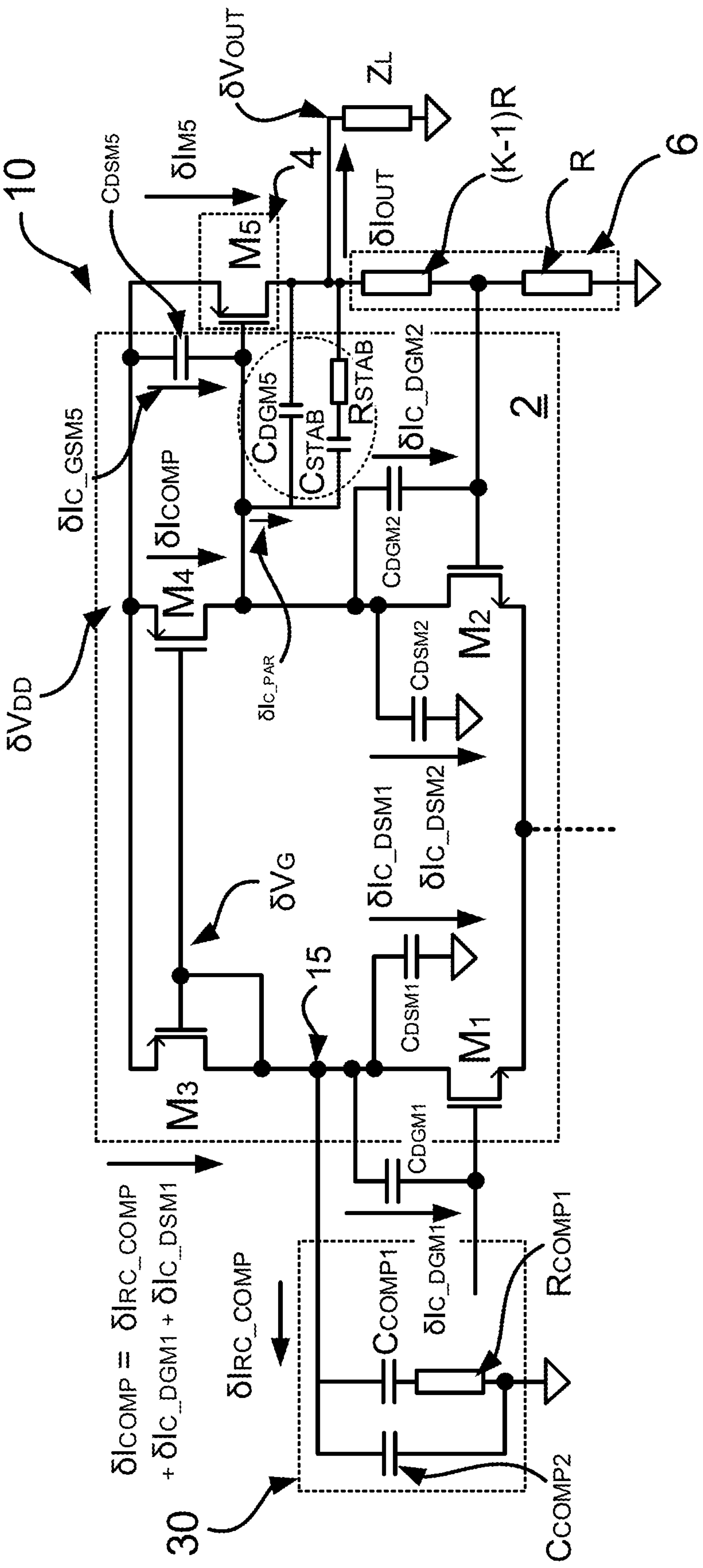
FIG. 6 schematically illustrates a voltage regulator with a compensation circuit according to another embodiment of this disclosure.

FIG. 6 schematically illustrates a voltage regulator 10 with a compensation circuit according to a second embodiment of this disclosure.

In FIG. 6, the following capacitances and resistances are denoted:

- $C_{DGM5}$ is the capacitance between the drain and gate of the transistor $M_5$;
- $C_{STAB}$ is the capacitance of an optional stability capacitor; and
- $R_{STAB}$ is the resistance of an optional stability resistor.

Also in FIG. 6, the following currents are denoted:

- $\delta I_{RC\_COMP}$ is the compensation current generated by the compensation network 30; and
- $\delta I_{C\_PAR}$ is the sum of the currents flowing through the two branches coupled between the gate and the drain of the transistor $M_5$ (the first branch containing $C_{DGM5}$ and the second branch containing $C_{STAB}$ and $R_{STAB}$).

The voltage regulator 10 of the embodiment of FIG. 6 is similar to the voltage regulator 10 described above in relation to FIG. 5, and only the differences will be described here in detail. In particular, the voltage regulator 10 in FIG. 6 uses a different stability compensation arrangement across drain and gate of the transistor $M_5$. In the embodiment of FIG. 6, this stability compensation arrangement comprises the optional stability capacitor $C_{STAB}$ connected in series with the optional stability resistor $R_{STAB}$. The stability capacitor $C_{STAB}$ and the stability resistor $R_{STAB}$ are connected in series between the gate and the drain of the transistor $M_5$ and accordingly are connected in parallel with the capacitance $C_{DGM5}$. In this embodiment, $C_{PAR}$ has two contributions: $C_{DGM5}$ and $C_{STAB}$.

In view of the different stability compensation arrangement across drain and gate of the transistor $M_5$, in order to allow the compensation network 30 to mimic the component network coupled between the second current terminal and the gate of the transistor $M_5$ of the second amplifier 4, the compensation network 30 may be provided with further components. In particular, in the embodiment of FIG. 6, the compensation network 30 comprises a first compensation capacitor $C_{COMP1}$ (corresponding to $C_{STAB}$), a second compensation capacitor $C_{COMP2}$ (corresponding to $C_{DGM5}$) and a compensation resistor $R_{COMP1}$ (corresponding to $R_{STAB}$). The first compensation capacitor $C_{COMP1}$ and the compensation resistor $R_{COMP1}$ may be coupled in series between the output of the compensation network 30 (which is itself coupled to the node 15 as explained previously) and a reference voltage, typically ground. The second compensation capacitor $C_{COMP2}$ may also be coupled between the output of the compensation network 30 and the reference voltage, typically ground. As can be seen from FIG. 6, the second compensation capacitor $C_{COMP2}$ may thus be arranged in parallel with the first compensation capacitor $C_{COMP1}$ and the compensation resistor $R_{COMP1}$. This network mimics the circuit arrangement of $C_{DGM5}$, $C_{STAB}$ and $R_{STAB}$. Moreover, to allow the aforementioned mimicking function to be performed by the compensation network 30, the capacitances $C_{COMP1}$ and $C_{COMP2}$ may be chosen to have substantially the same capacitance value as $C_{DGM5}$ and $C_{STAB}$, respectively, and $R_{COMP1}$ may be chosen to have substantially the same resistance value as $R_{STAB}$.

The compensation network 30 in FIG. 6 functions similarly to the compensation network 30 described in FIG. 5, by generating a compensation current $\delta I_{RC\_COMP}$ which is copied by the current mirror and compensates for the current $\delta I_{C\_PAR}$ flowing between the gate and the drain of the transistor $M_5$. Because of this current compensation, no current flows through $C_{GSM5}$ when variations $\delta V_{DD}$ occur in the supply voltage $V_{DD}$, which in turn prevents variations $\delta I_{M5}$ in the current $I_{M5}$ through the transistor $M_5$ from being generated by variations $\delta V_{DD}$. Accordingly, the embodiment can prevent variations $\delta I_{M5}$ from being generated under variations in $\delta V_{DD}$, even when the stability compensation arrangement across drain and gate of the transistor $M_5$ includes the optional stability capacitor $C_{STAB}$ and stability resistor $R_{STAB}$.

The embodiments of FIGS. 5 and 6 can accordingly address the problem of improving the stability of the output voltage $V_{OUT}$ of a voltage regulator 10 in presence of supply variations $\delta V_{DD}$.

Further improvements in the stability of the output voltage $V_{OUT}$ of a voltage regulator 10 can be obtained with additional circuitry of the kind that will now be described in relation to FIGS. 7 and 8. In particular, although the compensation network 30 described above can operate to prevent the generation of $\delta I_{M5}$ under variations in the supply voltage $V_{DD}$, which is the major source of variations $\delta V_{OUT}$ in the output voltage $V_{OUT}$ of a voltage regulator 10, $\delta I_{C\_PAR}$ may still flow into the load, which would cause a second order fluctuation of $V_{OUT}$. To address this, a further current mirror may be included in the compensation network 30 to copy the compensation current generated by the compensation network 30 to the output $V_{OUT}$, so as to cancel out $\delta I_{C\_PAR}$.

Figure 7:
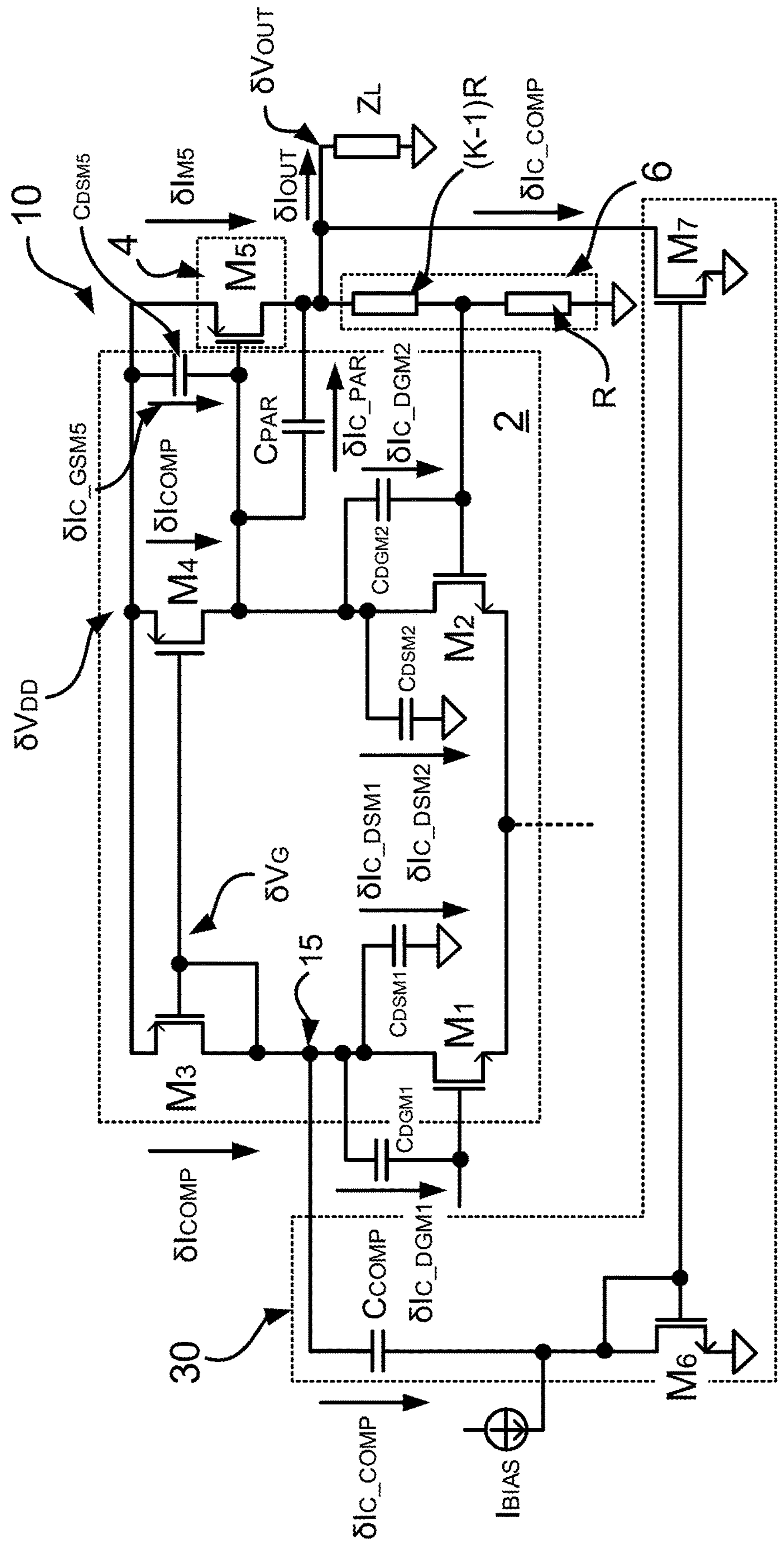
FIG. 7 schematically illustrates a voltage regulator with a compensation circuit according to a further embodiment of this disclosure.

FIG. 7 schematically illustrates a voltage regulator 10 with a compensation circuit according to a third embodiment of this disclosure. Note that the voltage regulator 10 in FIG. 7 is similar to the voltage regulator 10 described above in relation to FIG. 5, and only the differences will be described below in detail.

Figure 8:
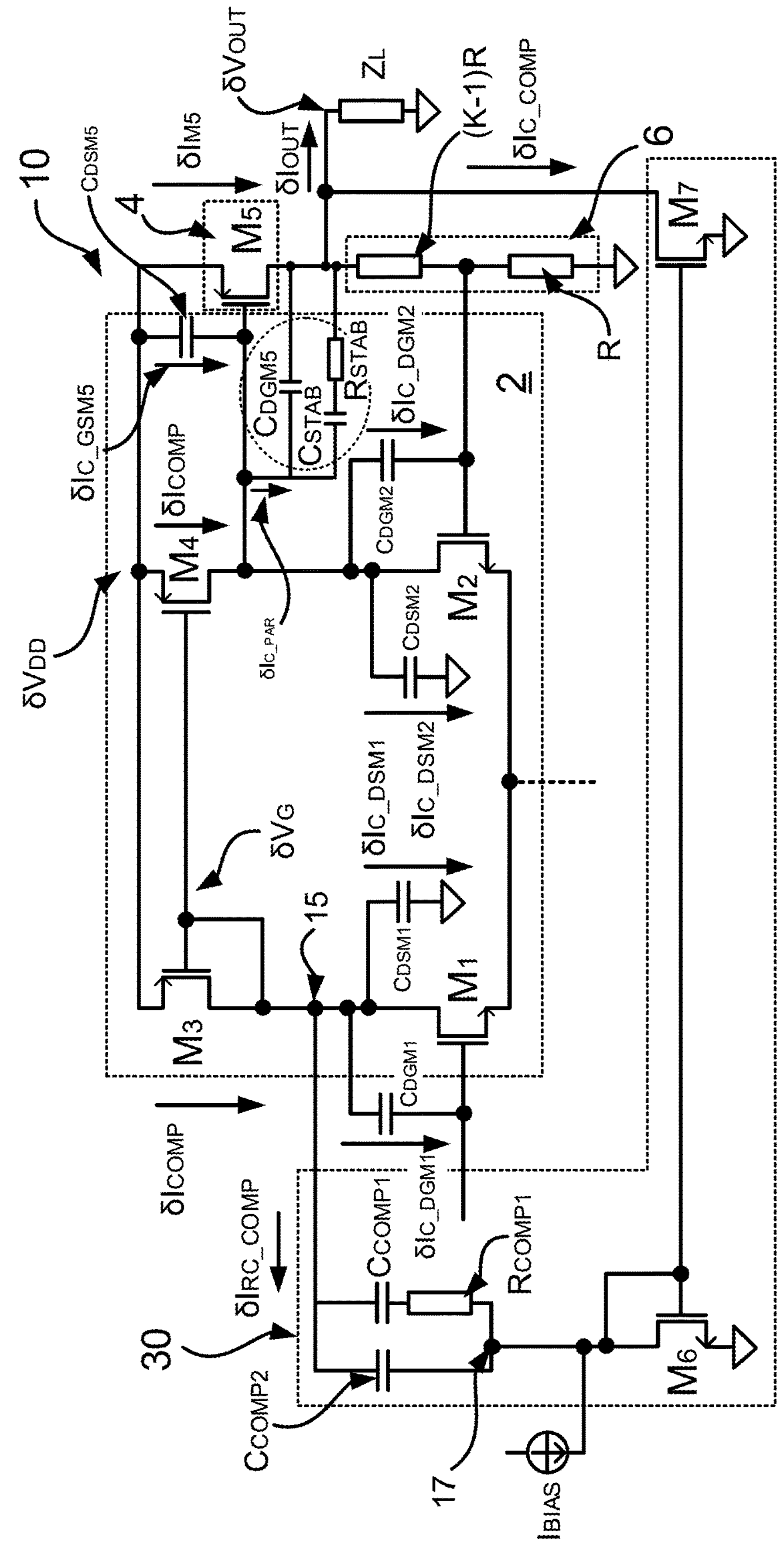
FIG. 8 schematically illustrates a voltage regulator with a compensation circuit according to another embodiment of this disclosure.

FIG. 8 schematically illustrates a voltage regulator 10 with a compensation circuit according to a fourth embodiment of this disclosure. Note that the voltage regulator 10 in FIG. 8 is similar to the voltage regulator 10 described above in relation to FIG. 6, and only the differences will be described below in detail.

In FIGS. 7 and 8 the compensation network 30 includes the aforementioned further current mirror, which includes a transistor $M_6$ and a transistor $M_7$. The transistors $M_6$ and $M_7$ in these embodiments are NMOS transistors, although it will be appreciated that PMOS transistors could be used. The gates of the transistors $M_6$, $M_7$ are coupled together and are also coupled to the drain of the transistor $M_6$. The sources of the transistors $M_6$, $M_7$ are coupled to a reference voltage, typically ground. The drain of the transistor $M_7$ is coupled to the output of the voltage regulator 10.

In the embodiment of FIG. 7, the drain of the transistor $M_6$ is coupled to a first side of the compensation capacitor $C_{COMP}$. A second side of the compensation capacitor $C_{COMP}$ is coupled to the output of the compensation network 30, which is itself coupled to the node 15 as explained above. A current source $I_{BIAS}$ may be coupled to a node between the drain of the transistor $M_6$ and the compensation capacitor $C_{COMP}$.

In the embodiment of FIG. 8, the drain of the transistor $M_6$ is coupled to node 17. The first compensation capacitor $C_{COMP1}$ and the compensation resistor $R_{COMP1}$ may be coupled in series between the output of the compensation network 30 (which is itself coupled to the node 15 as explained previously) and the node 17. The second compensation capacitor $C_{COMP2}$ may also be coupled between the output of the compensation network 30 and the node 17. As can be seen from FIG. 8, and in common with FIG. 6, the second compensation capacitor $C_{COMP2}$ may thus be arranged in parallel with the first compensation capacitor $C_{COMP1}$ and the compensation resistor $R_{COMP1}$. A current source $I_{BIAS}$ may be coupled to a node between the drain of the transistor $M_6$ and the node 17.

Thus, the drain of the transistor $M_6$ may form an input of the further current mirror, and the drain of the transistor $M_7$ may form an output of the further current mirror.

The operation of the embodiments in FIGS. 7 and 8 in relation to the generation of the compensation current ($\delta I_{COMP1}$) for preventing variations $\delta V_{DD}$ in the supply voltage $V_{DD}$ from causing variations $\delta I_{M5}$ from being generated is much the same as described above in relation to FIGS. 5 and 6, notwithstanding the introduction of the further current mirror. However, in addition to this, the further current mirror, which is coupled at its input to the passive components of the compensation network 30 (i.e. at the drain of the transistor $M_6$) and at its output to the output of the voltage regulator 10 (i.e. at the drain of the transistor $M_7$) allows the compensation current ($\delta I_{C\_COMP}$, $\delta I_{RC\_COMP}$) to be copied to the output of the voltage regulator 10 so as to cancel out $\delta I_{C\_PAR}$.

Accordingly, there has been described a voltage regulator and method. The voltage regulator includes a first amplifier having: a first input couplable to a reference voltage; a second input coupled to a feedback path; a current mirror; first and second branches coupled to an input and output of the current mirror. A node of the second branch forms an output of the first amplifier. The voltage regulator includes a second amplifier comprising a transistor having: a first terminal couplable to a supply voltage; a gate coupled to the output of the first amplifier; and a second terminal coupled to an output of the voltage regulator. The feedback path is coupled to the output of the voltage regulator. The voltage regulator includes a compensation network having at least one passive component to reduce variations in an output current of the voltage regulator caused by the parasitic capacitance of the transistor and variations in the supply voltage.

Although particular embodiments of this disclosure have been described, it will be appreciated that many modifications/additions and/or substitutions may be made within the scope of the claims.

The invention claimed is:

1. A voltage regulator comprising:

a first amplifier having:

a first input couplable to a reference voltage;

a second input coupled to a feedback path;

a current mirror having an input and an output;

a first branch coupled to the input of the current mirror; and a second branch coupled to the output of the current mirror, wherein a node of the second branch forms an output of the first amplifier;

a second amplifier comprising a transistor, wherein:

a first current terminal of the transistor forms a first input of the second amplifier couplable to a supply voltage;

a gate of the transistor forms a second input of the second amplifier coupled to the output of the first amplifier; and a second current terminal of the transistor forms an output of the second amplifier coupled to an output of the voltage regulator, wherein the transistor has a parasitic capacitance between the second current terminal and the gate, and wherein the feedback path is also coupled to the output of the voltage regulator; and a compensation network comprising at least one passive component, the at least one passive component comprising a first capacitor, wherein the compensation network is coupled to the input of the current mirror to reduce variations in an output current produced by the output of the voltage regulator caused by the parasitic capacitance between the second current terminal and the gate of the transistor of the second amplifier and variations in the supply voltage, wherein the compensation network further comprises a further current mirror, and wherein:

the first capacitor is coupled between the first branch of the first amplifier and an input of the current mirror; and an output of the further current mirror is coupled to the output of the voltage regulator.

2. The voltage regulator of claim 1, wherein the further current mirror comprises a first transistor and a second transistor, and wherein:

a first current terminal of the first transistor of the compensation network forms the input of the further current mirror;

a second current terminal of the first transistor of the compensation network is coupled to a reference voltage;

a gate of the first transistor of the compensation network is coupled to a gate of the second transistor of the compensation network;

a first current terminal of the second transistor of the compensation network forms the output of the further current mirror;

a second current terminal of the second transistor of the compensation network is coupled to a reference voltage; and the gate of the first transistor of the compensation network is coupled to the first current terminal of the first transistor of the compensation network.

3. The voltage regulator of claim 1, wherein:

the compensation network further comprises a resistor and a second capacitor coupled in series between the first branch of the first amplifier and the input of the current mirror; and the series coupled resistor and second capacitor are coupled in parallel with the first capacitor.

4. A reference voltage generator comprising:
a voltage regulator comprising:
a first amplifier having:
a first input couplable to a reference voltage;
a second input coupled to a feedback path;
a current mirror having an input and an output;
a first branch coupled to the input of the current mirror; and
a second branch coupled to the output of the current mirror, wherein a node of the second branch forms an output of the first amplifier;
a second amplifier comprising a transistor, wherein:
a first current terminal of the transistor forms a first input of the second amplifier couplable to a supply voltage;
a gate of the transistor forms a second input of the second amplifier coupled to the output of the first amplifier; and
a second current terminal of the transistor forms an output of the second amplifier coupled to an output of the voltage regulator, wherein the transistor has a parasitic capacitance between the second current terminal and the gate, and wherein the feedback path is also coupled to the output of the voltage regulator; and
a compensation network comprising at least one passive component, the at least one passive component comprising a first capacitor, wherein the compensation network is coupled to the input of the current mirror to reduce variations in an output current produced by the output of the voltage regulator caused by the parasitic capacitance between the second current terminal and the gate of the transistor of the second amplifier and variations in the supply voltage, and
wherein the compensation network comprises a further current mirror, and wherein:
the first capacitor is coupled between the first branch of the first amplifier and an input of the current mirror; and
an output of the further current mirror is coupled to the output of the voltage regulator.

5. A method of regulating a voltage, the method comprising:
providing a voltage regulator comprising:
a first amplifier having:
a first input couplable to a reference voltage;
a second input coupled to a feedback path;
a current mirror having an input and an output;
a first branch coupled to the input of the current mirror; and
a second branch coupled to the output of the current mirror, wherein a node of the second branch forms an output of the first amplifier;
a second amplifier comprising a transistor, wherein:
a first current terminal of the transistor forms a first input of the second amplifier couplable to a supply voltage;
a gate of the transistor forms a second input of the second amplifier coupled to the output of the first amplifier; and
a second current terminal of the transistor forms an output of the second amplifier coupled to an output of the voltage regulator, wherein the transistor has a parasitic capacitance between the second current terminal and the gate, and wherein the feedback path is also coupled to the output of the voltage regulator; and
a compensation network comprising at least one passive component, the at least one passive component comprising a first capacitor, wherein the compensation network is coupled to the input of the current mirror to reduce variations in an output current produced by the output of the voltage regulator caused by the parasitic capacitance between the second current terminal and the gate of the transistor of the second amplifier and variations in the supply voltage, and
wherein the compensation network comprises a further current mirror, and wherein:
the first capacitor is coupled between the first branch of the first amplifier and an input of the current mirror; and
an output of the further current mirror is coupled to the output of the voltage regulator; and
using the compensation network to reduce variations in an output current produced by the output of the voltage regulator caused by the parasitic capacitance between the second current terminal and the gate of the transistor of the second amplifier and variations in the supply voltage.

6. The method of claim 5, in which the compensation network mimics a component network coupled between the second current terminal and the gate of the transistor of the second amplifier.

7. The method of claim 5, in which:
the compensation network comprises a resistor and a second capacitor coupled in series, wherein the series coupled resistor and second capacitor are coupled in parallel with the first capacitor.

8. The voltage regulator of claim 1, wherein the compensation network is operable to mimic a component network coupled between the second current terminal and the gate of the transistor of the second amplifier.

9. The voltage regulator of claim 1, wherein the first amplifier further comprises a transistor located in the first branch and a transistor located in the second branch, wherein the transistors are arranged as a differential pair, wherein a gate of the transistor in the first branch forms the first input of the first amplifier couplable to the reference voltage, wherein a gate of the transistor in the second branch forms the second input of the first amplifier coupled to the feedback path, and wherein the compensation network is further operable to compensate for variations in the output current produced by the output of the voltage regulator caused by parasitic capacitance between a current terminal and the gate of the transistor in each branch and variations in the supply voltage.

10. The voltage regulator of claim 1, wherein the compensation network further comprises a resistor and a second capacitor coupled in series and wherein the series coupled resistor and second capacitor are coupled in parallel with the first capacitor.

11. The voltage regulator of claim 1, further comprising a stability compensation circuit coupled between the gate and the second current terminal of the transistor of the second amplifier, wherein the compensation network is further operable to reduce variations in the output current produced by the output of the voltage regulator caused by the stability compensation circuit and variations in the supply voltage.

12. The voltage regulator of claim 11, wherein the stability compensation circuit comprises a capacitor coupled between the gate and the second current terminal of the transistor of the second amplifier.

13. The voltage regulator of claim 12, wherein the stability compensation circuit further comprises a resistor, wherein the capacitor and the resistor of the stability compensation circuit are coupled in series between the gate and the second current terminal of the transistor of the second amplifier.

* * * * *